United States Patent
Wu et al.

(10) Patent No.: US 8,838,031 B2
(45) Date of Patent: Sep. 16, 2014

(54) ALTERNATIVE PATH CONFIGURATION FOR PEER-TO-PEER NETWORKING

(75) Inventors: Zhibin Wu, Bridgewater, NJ (US); Georgios Tsirtsis, London (GB); Vincent D. Park, Budd Lake, NJ (US); Mathew Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 13/252,018

(22) Filed: Oct. 3, 2011

(65) Prior Publication Data

US 2013/0084914 A1 Apr. 4, 2013

(51) Int. Cl.
| | |
|---|---|
| H04B 7/00 | (2006.01) |
| H04W 76/02 | (2009.01) |
| H04M 1/725 | (2006.01) |
| H04W 4/00 | (2009.01) |
| H04W 48/18 | (2009.01) |
| H04W 88/06 | (2009.01) |

(52) U.S. Cl.
CPC .......... *H04W 76/023* (2013.01); *H04M 1/7253* (2013.01); *H04W 4/008* (2013.01); *H04W 48/18* (2013.01); *H04W 88/06* (2013.01)
USPC ............................ 455/41.2; 45/41.3; 45/426.1

(58) Field of Classification Search
USPC .......... 455/424, 426.1, 435.2, 436–444, 449, 455/450, 41.2, 445, 41.3; 370/328
See application file for complete search history.

(56) References Cited

U.S. PATENT DOCUMENTS

| | | | | |
|---|---|---|---|---|
| 7,697,893 | B2 * | 4/2010 | Kossi et al. .................. | 455/41.2 |
| 8,130,747 | B2 * | 3/2012 | Li et al. ........................ | 370/351 |
| 8,478,254 | B2 * | 7/2013 | Mgrdechian et al. ....... | 455/414.1 |
| 2003/0236069 | A1 * | 12/2003 | Sakata et al. ................. | 455/11.1 |
| 2008/0311912 | A1 | 12/2008 | Balasubramanian et al. | |
| 2009/0129587 | A1 * | 5/2009 | Zhou et al. ...................... | 380/42 |
| 2009/0275326 | A1 * | 11/2009 | Lee et al. ................... | 455/422.1 |
| 2009/0290502 | A1 * | 11/2009 | Tinnakornsrisuphap et al. ............................ | 370/252 |
| 2009/0296635 | A1 * | 12/2009 | Hui et al. ....................... | 370/328 |
| 2009/0316595 | A1 * | 12/2009 | Kwon et al. .................. | 370/252 |
| 2010/0041393 | A1 * | 2/2010 | Kwon et al. ................ | 455/426.1 |
| 2010/0105409 | A1 | 4/2010 | Agarwal et al. | |
| 2010/0128695 | A1 | 5/2010 | Nagaraja | |
| 2010/0169498 | A1 | 7/2010 | Palanki et al. | |
| 2010/0285797 | A1 | 11/2010 | Ghai et al. | |
| 2010/0302958 | A1 | 12/2010 | Wietfeldt et al. | |
| 2011/0009140 | A1 * | 1/2011 | Hwang et al. ................. | 455/509 |

(Continued)

FOREIGN PATENT DOCUMENTS

EP    1633104 A1    3/2006

OTHER PUBLICATIONS

International Search Report and Written Opinion—PCT/US2012/000495—ISA/EPO—Jan. 25, 2013.

*Primary Examiner* — Dominic E Rego
(74) *Attorney, Agent, or Firm* — James K. O'Hare (57) ABSTRACT

A method, an apparatus, and a computer program product are provided in which information is exchanged through peer-to-peer communication with a second wireless device using a first radio technology. The information regards at least one additional radio technology. In addition, whether to utilize a second radio technology of the at least one additional radio technology for peer-to-peer communication with the second wireless device rather than the first radio technology is determined. Furthermore, the first radio technology is utilized to exchange control information for the second radio technology.

40 Claims, 9 Drawing Sheets

(56) References Cited

U.S. PATENT DOCUMENTS

| | | | |
|---|---|---|---|
| 2011/0019644 A1* | 1/2011 | Cheon et al. | 370/331 |
| 2011/0165878 A1* | 7/2011 | Nylander et al. | 455/436 |
| 2012/0122467 A1* | 5/2012 | Auer et al. | 455/452.1 |
| 2012/0165012 A1* | 6/2012 | Fischer et al. | 455/435.1 |
| 2012/0221692 A1* | 8/2012 | Steiner et al. | 709/222 |

\* cited by examiner

ALTERNATIVE PATH CONFIGURATION FOR PEER-TO-PEER NETWORKING

BACKGROUND

1. Field

The present disclosure relates generally to communication systems, and more particularly, to an alternative path configuration for peer-to-peer networking.

2. Background

In a peer-to-peer network, radio devices that communicate directly with each other must employ compatible radios and work with compatible settings of that radio technology. Wireless devices are often equipped with multiple radios of different access technologies or a single cognitive radio that is capable of switching between different access technologies. The access technologies have differing characteristics. To optimize the differing characteristics of the access technologies, there is a need for an apparatus and a method that provide an alternative radio technology path configuration for peer-to-peer networks.

SUMMARY

In an aspect of the disclosure, a method of operating a first wireless device includes exchanging information through peer-to-peer communication with a second wireless device using a first radio technology. The information regards at least one additional radio technology. In addition, the method includes determining whether to utilize a second radio technology of the at least one additional radio technology for peer-to-peer communication with the second wireless device rather than the first radio technology. Furthermore, the method includes utilizing the first radio technology to exchange control information for the second radio technology.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

Figure 1:
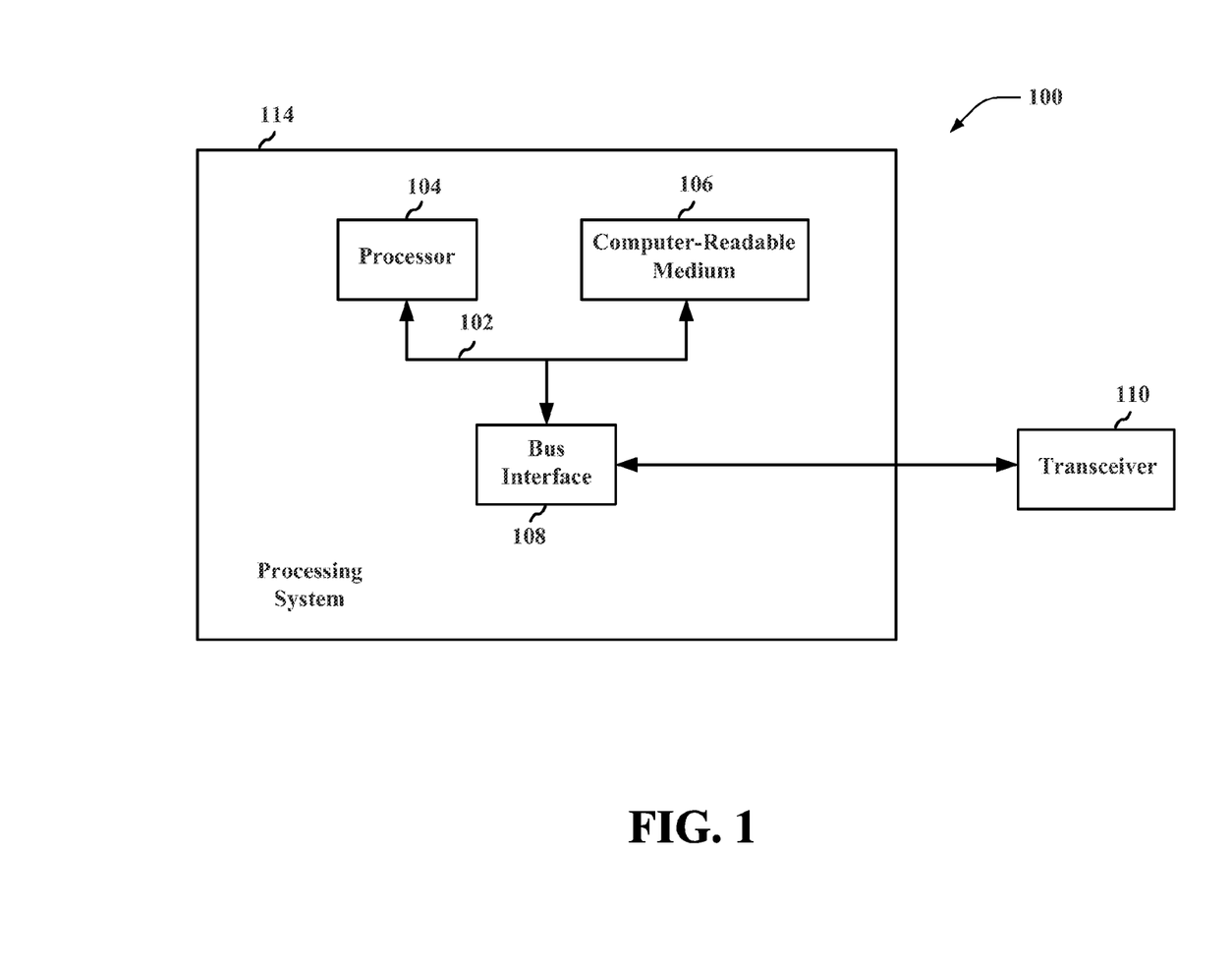
FIG. 1 is a diagram illustrating an example of a hardware implementation for an apparatus employing a processing system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
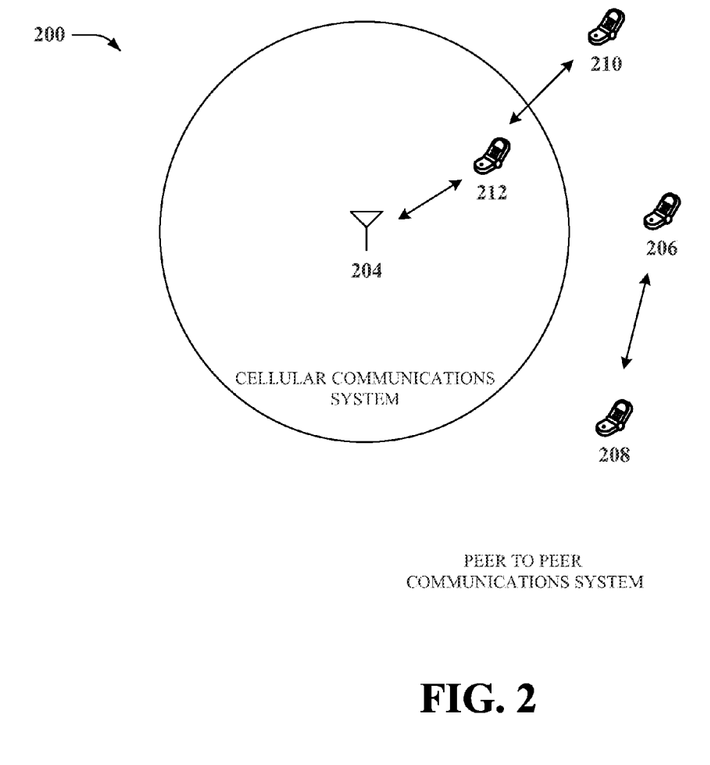
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus may be discussed within the context of FlashLinQ. However, one of ordinary skill in the art would understand that the exemplary methods and apparatuses are applicable more generally to a variety of other wireless peer-to-peer communication systems.

Figure 3:
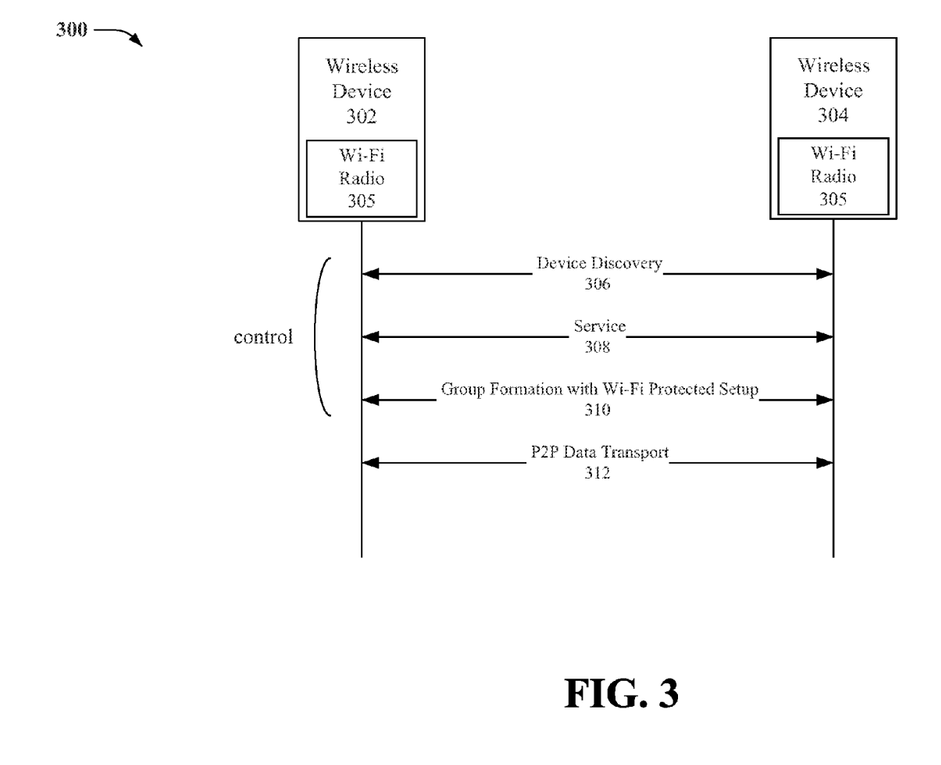
FIG. 3 is a diagram illustrating setup and communication using a radio technology.

FIG. 3 is a diagram 300 illustrating setup and communication using Wi-Fi radio technology. When two wireless devices want to establish a peer-to-peer connection together, a radio technology is usually employed. For example, the wireless devices 302, 304 may establish a peer-to-peer connection using Wi-Fi radios 305. The Wi-Fi direct specification requires the setup procedure to occur through Wi-Fi radio communication. As such, to establish a Wi-Fi connection, the wireless devices 302, 304 participate in device discovery (306), service discovery (308), and authentication and group owner election process (310) using the Wi-Fi radio technology. Once the Wi-Fi connection is established, the wireless devices 302, 304 may communicate data (312).

Because radios usually work with a large number of various settings of physical (PHY) and medium access control (MAC) parameters (e.g., channel, transmit power, etc.), bootstrapping the radio path setup 306-310 often requires dynamic scanning of all possible channels and negotiating a data rate, an access timing, and other PHY and MAC parameters. Such a process is time-consuming and uses a lot of battery power even when both radios follow a well-defined standard procedure. Further, if there is no existing security establishment for a new peer-to-peer connection, peer-to-peer group negotiations and network formation may be exposed to various kinds of attacks. Moreover, a setup attempt may fail simply because the wireless devices 302, 304 are not within a feasible communication range. As such, it may be problematic for the wireless devices 302, 304 to discover each other, establish a radio link, and form a peer-to-peer group.

Figure 4:
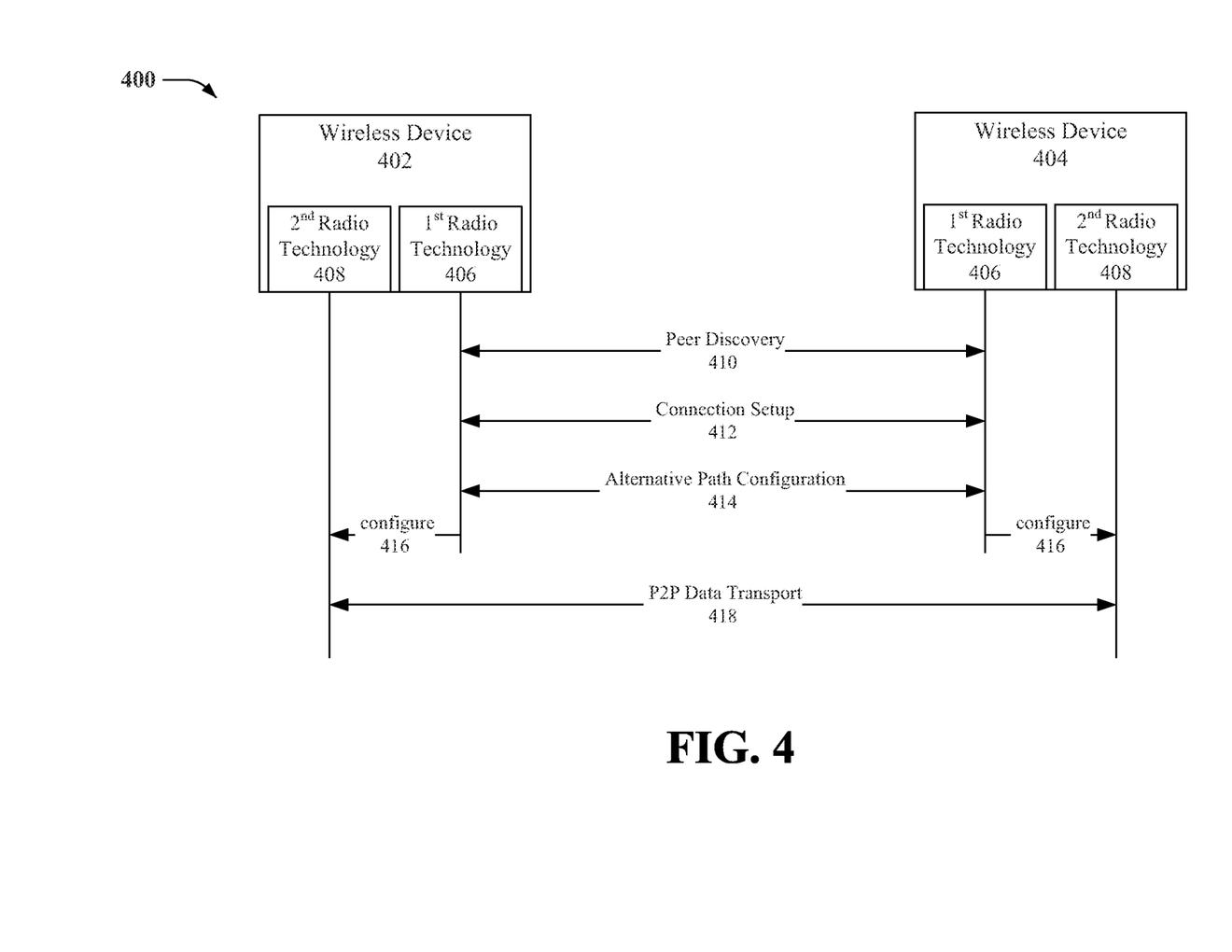
FIG. 4 is a diagram illustrating an exemplary setup and communication using a plurality of radio technologies.

FIG. 4 is a diagram 400 illustrating an exemplary setup and communication using a plurality of radio technologies. Radio access technologies such as FlashLinQ, WiMedia, Bluetooth, ZigBee, and Wi-Fi have differing characteristics with respect to efficiency of establishing a connection, discovery performance, power usage, security, cost, and other performance characteristics. According to an exemplary method, the wireless devices 402, 404 discover each other (410) and perform connection setup (412) using a first radio technology 406. In order to optimize at least one of the differing characteristics of available multiple access technologies, the wireless devices 402, 404 then exchange, through the first radio technology 406, information regarding a second radio technology 408 to utilize for peer-to-peer communication. The wireless devices 402, 404 then determine whether to use the second radio technology 408 rather than the first radio technology 406 for peer-to-peer data transport (418). If the wireless devices 402, 404 determine to use the second radio technology 408 rather than the first radio technology 406 for peer-to-peer data transport (418), the wireless device 402, 404 configure the alternative path through the second radio technology (414) using the first radio technology 406. To configure the alternative path through the second radio technology, the wireless devices 402, 404 exchange PHY layer parameters, MAC layer parameters, network layer parameters, and/or security parameters for the second radio technology 408. The wireless devices 402, 404 may then configure (416) the second radio technology 408 with the exchanged parameters in order to prepare the second radio technology 408 for peer-to-peer data transport (418). Thereafter, the wireless devices 402, 404 may communicate data (418) through the second radio technology 408 without performing the peer device discovery and connection parameter negotiation normally required for the second radio technology 408.

An example best demonstrates the alternative path configuration. Assume the wireless devices each have a FlashLinQ radio and a Wi-Fi radio. Based on the efficiency of establishing a connection, discovery performance, power usage, security, and/or other performance benefits the wireless devices 402, 404 may determine to use their FlashLinQ radios rather than Wi-Fi radios for peer discovery (410) and connection setup (412). After conducting peer discovery (410) and connection setup (412) using their FlashLinQ radios, the wireless devices 402, 404 may exchange information that indicates that they each have a Wi-Fi radio. The wireless devices 402, 404 may then determine whether to utilize their Wi-Fi radios for peer-to-peer data transport (418) rather than their FlashLinQ radios with which they currently have a connection. The wireless devices 402, 404 determine a first metric for utilizing their FlashLinQ radios and a second metric for utilizing their Wi-Fi radios. The wireless devices then determine whether to utilize their Wi-Fi radios rather than their FlashLinQ radios for peer-to-peer data transport (418) based on a comparison of the first and second metrics. The first and second metrics may be related to performance, throughput, power usage, security, cost, or other characteristics of the radio access technologies. For example, the first and second metrics may be associated with a cost for utilizing each of the radio access technologies. The wireless devices 402, 404 may determine to use their Wi-Fi radios when the cost to communicate the data is less using their Wi-Fi radios than using their FlashLinQ radios. For another example, the first metric may be associated with one or more performance characteristics of the FlashLinQ radio and the second metric may be associated with one or more performance characteristics of the Wi-Fi radio. The wireless devices 402, 404 may determine to use their Wi-Fi radios when a comparison of the first and second metrics indicates that peer-to-peer data transport through their Wi-Fi radios would have better performance than peer-to-peer data transport through their FlashLinQ radios.

When the first and second metrics are associated with cost, the cost may be monetary, such as a cost charged by an air-link operator for bytes communicated. Cost also may be interpreted to be non-monetary, such as various performance characteristics of the radio access technology (e.g., power usage or 1/throughput). Cost also may be both monetary and non-monetary. For example, cost may be a weighted function of a monetary cost and non-monetary costs. Furthermore, the wireless devices 402, 404 may consider all common radio access technologies for feasibility, cost, throughput, security, power usage, or other performance characteristics before selecting to migrate to one of the common radio access technologies.

Use of multiple radio access technologies, as described supra, would allow a first radio technology with a robust and automated discovery feature, such as FlashLinQ, to establish a control plane to facilitate the discovery and establishment of an alternative radio path through a second radio technology. By first establishing a secure link between two peers using a first radio technology, all native negotiations and other control signaling that would normally occur in the second radio technology can be moved to the first radio technology for transport. The exemplary method has many benefits. First, a lengthy device discovery phase with the second radio technology can be avoided because the preferred channel/frequency settings are already determined by out-of-band means. Second, pitfalls where the radio connectivity of the second radio technology is unrealistic or unstable can be avoided. For example, range estimation can be conducted based on existing radio signal strength so that link setup of the second radio technology can be guided to happen only when the devices are within the communication range of the second radio technology. Undesired spectrum caused by interference or other reasons can be precluded. Third, the first radio technology may provide better security and therefore may be better to use for device discovery and connection setup. Fourth, the peer-to-peer network formation in the radio domain of the second radio technology can be jointly optimized by all involved devices with extensive negotiations in the control plane, which is normally inconvenient or impossible to do with in-band signaling. Lastly, multiple radio technologies can be utilized seamlessly based on optimizing the overall communication performance and taking advantage of various performance benefits and/or cost savings of each of the radio technologies.

Figure 5:
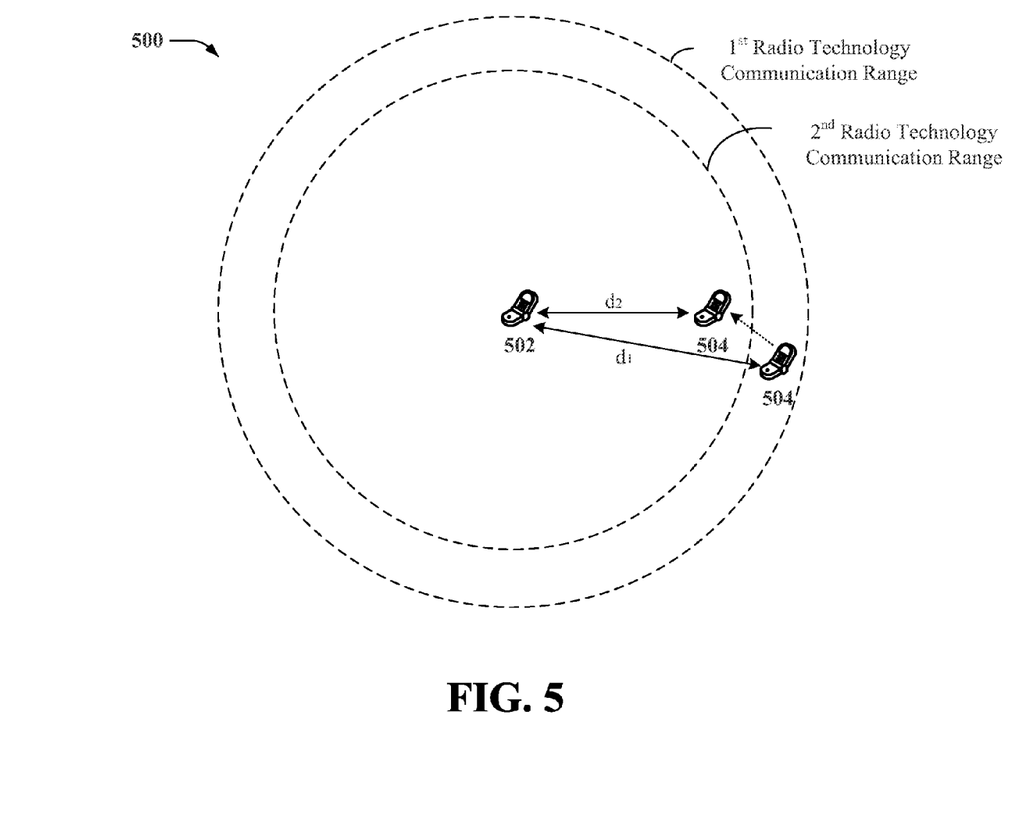
FIG. 5 is a diagram for illustrating an exemplary method.

FIG. 5 is a diagram 500 for illustrating an exemplary method. The wireless devices 502, 504 are both equipped with a first radio technology and a second radio technology. The first radio technology has a greater communication range than the second radio technology. The wireless devices 502, 504 may desire to communicate through the second radio technology, but because the wireless devices 502, 504 are not within range with a distance $d_1$ between them, the wireless devices 502, 504 may perform discovery, connection setup, and control information exchange using the first radio technology. If the wireless devices 502, 504 continue to be outside the range of the second radio technology, but within range of the first radio technology, the wireless devices 502, 504 may communicate data through the first radio technology. However, if the wireless devices 502, 504 move within range of the second radio technology with a distance $d_2$ between them, the wireless devices 502, 504 may configure the second radio technology with the exchanged control information and communicate data through the second radio technology.

When the wireless devices 502, 504 are not within communication range of the second radio technology, but anticipate being within communication range of the second radio technology at some future time, the wireless devices 502, 504 may use the first wireless technology for setup and control information exchange and switch to using the second radio technology once within communication range. As such, the wireless devices 502, 504 may exchange information using their first radio technology when the first communication range is greater than a current distance $d_1$ between them, the second communication range is less than the current distance $d_1$ between them, and the wireless devices 502, 504 anticipates that the second communication range will be greater than a future distance $d_2$ between the wireless devices 502, 504.

Figure 6:
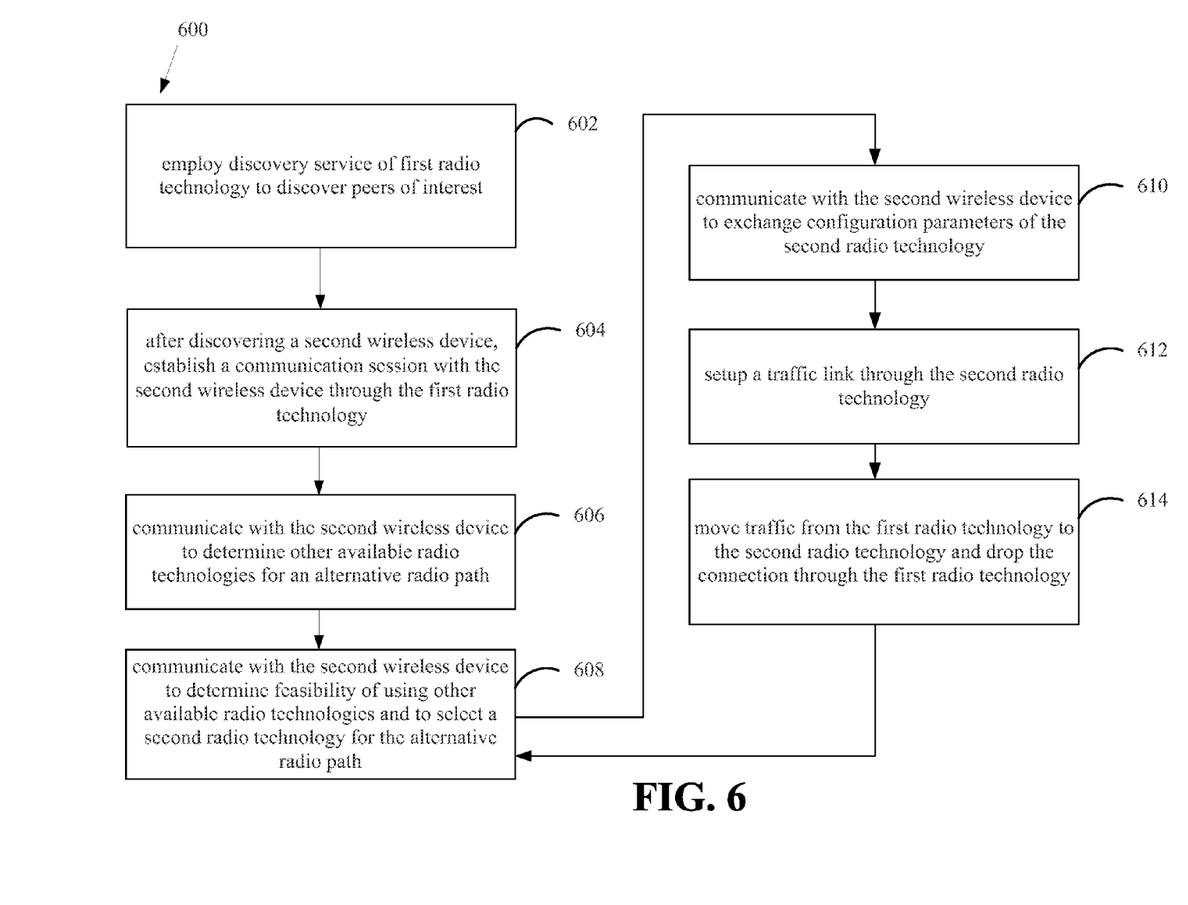
FIG. 6 is a flow chart of a first method of wireless communication.

FIG. 6 is a flow chart 600 of a first method of wireless communication. The method is performed by a first wireless device. As shown in FIG. 6, the first wireless device employs a discovery service of a first radio technology to discover peers of interest (602). After discovering a second wireless device, the first wireless device establishes a communication session with the second wireless device through the first radio technology (604). The first wireless device communicates with the second wireless device to determine other available radio technologies for an alternative radio path (606). The first wireless device communicates with the second wireless device to determine the feasibility (e.g., whether within range, cost, throughput, efficiency, power usage, and/or other performance characteristics) of using other radio technologies and to select a second radio technology for the alternative radio path (608). Once the second radio technology is selected, the first wireless device communicates with the second wireless device to exchange configuration parameters of the second radio technology (610). The configuration parameters allow the second radio technology to be used without performing peer device discovery and connection parameter negotiation through the second radio technology. Once the connection is established with the second radio technology, the first wireless device sets up a traffic link through the second radio technology (612). The first wireless device then moves traffic from the first radio technology to the second radio technology and drops the connection through the first radio technology (614). Steps 608, 610, 612, 614 may be repeated with various other radio technologies.

Figure 7:
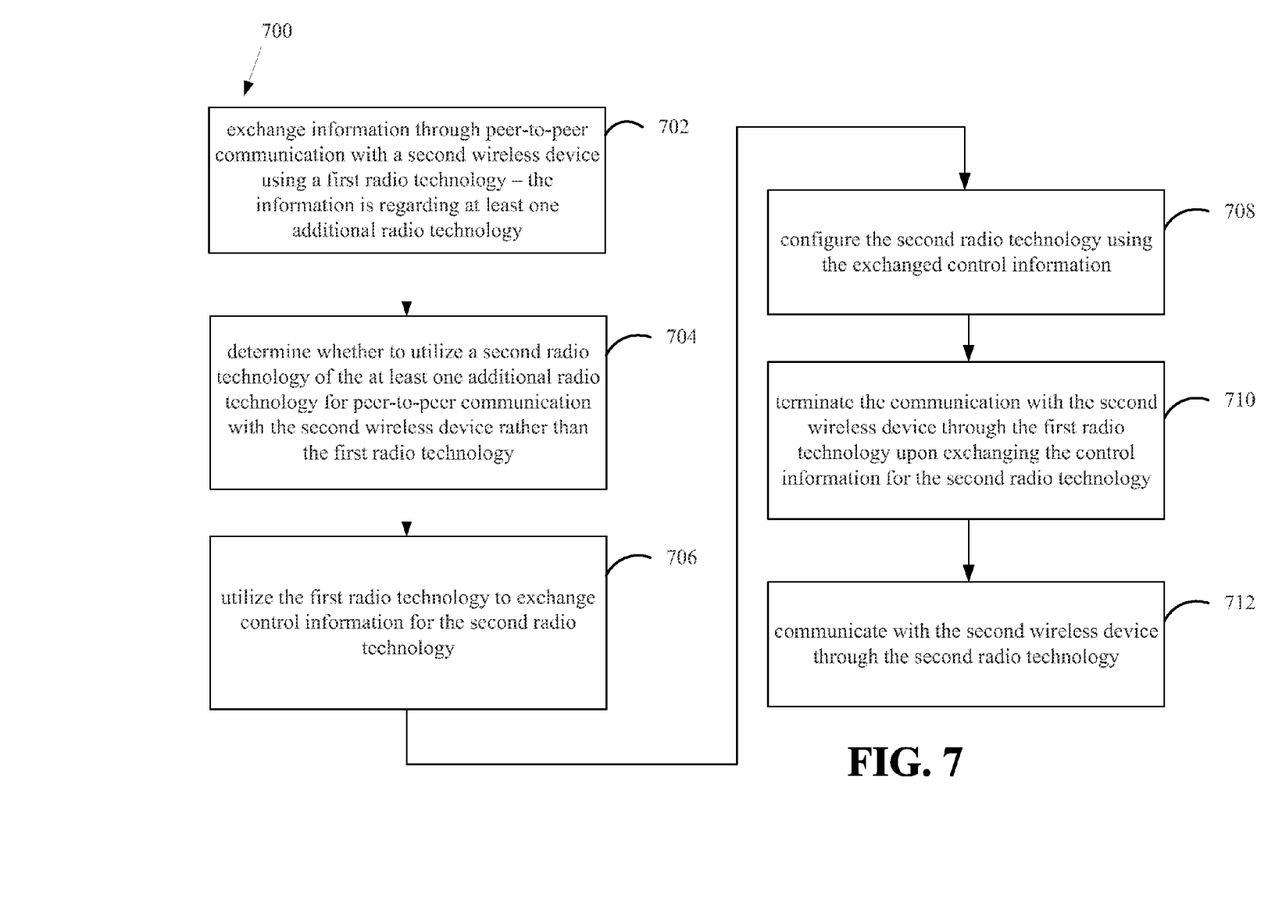
FIG. 7 is a flow chart of a second method of wireless communication.

FIG. 7 is a flow chart 700 of a second method of wireless communication. The method is performing by a first wireless device. According to the method, the first wireless device exchanges information through peer-to-peer communication with a second wireless device using a first radio technology (702). The information regards at least one additional radio technology (702). The first wireless device may exchange information with the second wireless device using the first radio technology by conducting peer discovery with the second wireless device through the first radio technology, forming a peer-to-peer communication link with the second wireless device through the first radio technology, and exchanging information on at least one additional radio technology. The first wireless device determines whether to utilize a second radio technology of the at least one additional radio technology for peer-to-peer communication with the second wireless device rather than the first radio technology (704). The first wireless device utilizes the first radio technology to exchange control information for the second radio technology (706). The control information includes at least one of PHY layer parameters, MAC layer parameters, network layer parameters, or security parameters for the second radio technology. The first wireless device configures the second radio technology using the exchanged control information (708). The first wireless device terminates the communication with the second wireless device through the first radio technology upon exchanging the control information for the second radio technology (710). The first wireless device communicates with the second wireless device through the second radio technology (712).

Figure 8:
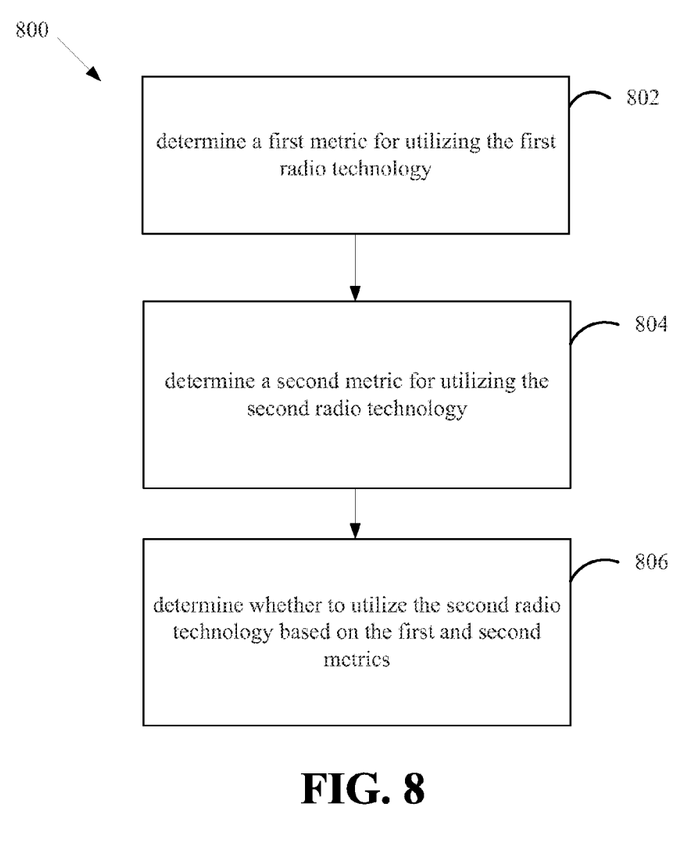
FIG. 8 is a flow chart of a third method of wireless communication.

FIG. 8 is a flow chart 800 of a third method of wireless communication. The method is performed by a first wireless device. According to the method, the first wireless device determines whether to utilize the second radio technology in step 704 by determining a first metric for utilizing the first radio technology (802), determining a second metric for utilizing the second radio technology (804), and determining whether to utilize the second radio technology based on the first and second metrics (806). In one configuration, the first metric is a cost for utilizing the first radio technology and the second metric is a cost for utilizing the second radio technology, and the second radio technology is determined to be utilized when the second metric is less than the first metric. In one configuration, the first metric is based on at least one performance characteristic of the first radio technology and the second metric is based on at least one performance characteristic of the second radio technology, and the second radio technology is determined to be utilized when a comparison of the first metric and the second metric indicates that the second radio technology would have better performance than the first radio technology. In one configuration, the first metric is a first data transmission rate of communication using the first radio technology and the second metric is a second data transmission rate of communication using the second radio technology, and the second radio technology is determined to be utilized when the second metric is greater than the first metric. In one configuration, the first wireless device and the second wireless device are separated by a distance, the first radio technology has a first communication range and the second radio technology has a second communication range less than the first communication range, and the second radio technology is determined to be utilized when the second communication range is greater than the distance. In such a configuration, the first wireless device exchanges information with the second wireless device using the first radio technology when the first communication range is greater than the distance, the second communication range is less than the distance, and the first wireless device anticipates that the second communication range will be greater than a future distance between the first and second wireless devices.

Figure 9:
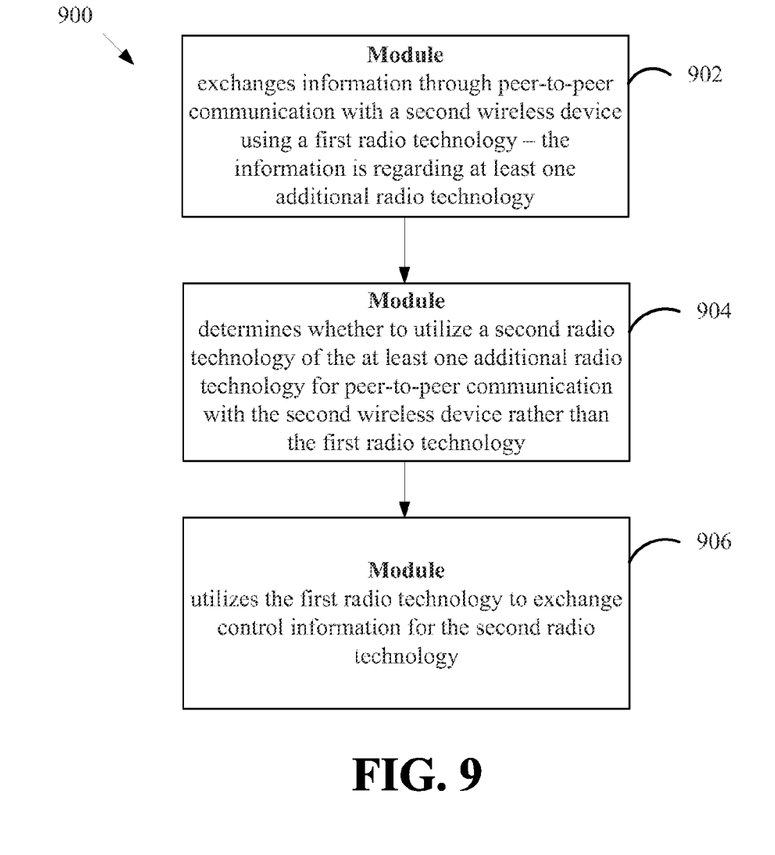
FIG. 9 is a conceptual block diagram illustrating the functionality of an exemplary apparatus.

FIG. 9 is a conceptual block diagram 900 illustrating the functionality of an exemplary apparatus 100. As shown in FIG. 9, the apparatus 100, which may be a wireless device such as the wireless device 212, includes a module 902 that exchanges information through peer-to-peer communication with a second wireless device using a first radio technology. The information regards at least one additional radio technology. The apparatus 100 further includes a module 904 that determines whether to utilize a second radio technology of the at least one additional radio technology for peer-to-peer communication with the second wireless device rather than the first radio technology. The apparatus 100 further includes a module 906 that utilizes the first radio technology to exchange control information for the second radio technology. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication includes means for exchanging information through peer-to-peer communication with a second apparatus using a first radio technology. The information regards at least one additional radio technology. The apparatus 100 further includes means for determining whether to utilize a second radio technology of the at least one additional radio technology for peer-to-peer communication with the second apparatus rather than the first radio technology. The apparatus 100 further includes means for utilizing the first radio technology to exchange control information for the second radio technology. In one configuration, the means for determining whether to utilize the second radio technology includes means for determining a first metric for utilizing the first radio technology, means for determining a second metric for utilizing the second radio technology, and means for determining whether to utilize the second radio technology based on the first and second metrics. The apparatus 100 may further include means for configuring the second radio technology using the exchanged control information, means for terminating the communication with the second apparatus through the first radio technology upon exchanging the control information for the second radio technology, and means for communicating with the second apparatus through the second radio technology. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a first wireless device, comprising:
    exchanging information through peer-to-peer communication with a second wireless device using a first radio technology, the information regarding at least one additional radio technology;
    determining whether to utilize a second radio technology of the at least one additional radio technology for peer-to-peer communication with the second wireless device rather than the first radio technology; and
    utilizing the first radio technology to exchange control information for the second radio technology.

2. The method of claim 1, wherein the determining whether to utilize the second radio technology comprises:
    determining a first metric for utilizing the first radio technology;
    determining a second metric for utilizing the second radio technology; and
    determining whether to utilize the second radio technology based on the first and second metrics.

3. The method of claim 2, wherein the first metric is a cost for utilizing the first radio technology and the second metric is a cost for utilizing the second radio technology, and the second radio technology is determined to be utilized when the second metric is less than the first metric.

4. The method of claim 2, wherein the first metric is based on at least one performance characteristic of the first radio technology and the second metric is based on at least one performance characteristic of the second radio technology, and the second radio technology is determined to be utilized when a comparison of the first metric and the second metric indicates that the second radio technology would have better performance than the first radio technology.

5. The method of claim 2, wherein the first metric is a first data transmission rate of communication using the first radio technology and the second metric is a second data transmission rate of communication using the second radio technology, and the second radio technology is determined to be utilized when the second metric is greater than the first metric.

6. The method of claim 2, wherein the first wireless device and the second wireless device are separated by a distance, the first radio technology has a first communication range and the second radio technology has a second communication range less than the first communication range, and the second radio technology is determined to be utilized when the second communication range is greater than the distance.

7. The method of claim 6, wherein the exchanging information with the second wireless device using the first radio technology occurs when the first communication range is greater than the distance, the second communication range is less than the distance, and the first wireless device anticipates that the second communication range will be greater than a future distance between the first wireless device and the second wireless device.

8. The method of claim 1, wherein the exchanging information with a second wireless device using a first radio technology comprises conducting peer discovery with the second wireless device through the first radio technology.

9. The method of claim 1, wherein the exchanged control information comprises at least one of physical (PHY) layer parameters, media access control (MAC) layer parameters, network layer parameters, or security parameters for the second radio technology.

10. The method of claim 9, further comprising:
    configuring the second radio technology using the exchanged control information;
    terminating the communication with the second wireless device through the first radio technology upon exchanging the control information for the second radio technology; and
    communicating with the second wireless device through the second radio technology.

11. An apparatus for wireless communication, comprising:
    means for exchanging information through peer-to-peer communication with a second apparatus using a first radio technology, the information regarding at least one additional radio technology;
    means for determining whether to utilize a second radio technology of the at least one additional radio technology for peer-to-peer communication with the second apparatus rather than the first radio technology; and
    means for utilizing the first radio technology to exchange control information for the second radio technology.

12. The apparatus of claim 11, wherein the means for determining whether to utilize the second radio technology comprises:
    means for determining a first metric for utilizing the first radio technology;
    means for determining a second metric for utilizing the second radio technology; and
    means for determining whether to utilize the second radio technology based on the first and second metrics.

13. The apparatus of claim 12, wherein the first metric is a cost for utilizing the first radio technology and the second metric is a cost for utilizing the second radio technology, and the second radio technology is determined to be utilized when the second metric is less than the first metric.

14. The apparatus of claim 12, wherein the first metric is based on at least one performance characteristic of the first radio technology and the second metric is based on at least one performance characteristic of the second radio technology, and the second radio technology is determined to be utilized when a comparison of the first metric and the second metric indicates that the second radio technology would have better performance than the first radio technology.

15. The apparatus of claim 12, wherein the first metric is a first data transmission rate of communication using the first radio technology and the second metric is a second data transmission rate of communication using the second radio technology, and the second radio technology is determined to be utilized when the second metric is greater than the first metric.

16. The apparatus of claim 12, wherein the apparatus and the second apparatus are separated by a distance, the first radio technology has a first communication range and the second radio technology has a second communication range less than the first communication range, and the second radio technology is determined to be utilized when the second communication range is greater than the distance.

17. The apparatus of claim 16, wherein the exchanging information with the second apparatus using the first radio technology occurs when the first communication range is greater than the distance, the second communication range is less than the distance, and the apparatus anticipates that the second communication range will be greater than a future distance between the apparatus and the second apparatus.

18. The apparatus of claim 11, wherein the exchanging information with a second apparatus using a first radio technology comprises conducting peer discovery with the second apparatus through the first radio technology.

19. The apparatus of claim 11, wherein the exchanged control information comprises at least one of physical (PHY) layer parameters, media access control (MAC) layer parameters, network layer parameters, or security parameters for the second radio technology.

20. The apparatus of claim 19, further comprising:
means for configuring the second radio technology using the exchanged control information;
means for terminating the communication with the second apparatus through the first radio technology upon exchanging the control information for the second radio technology; and
means for communicating with the second apparatus through the second radio technology.

21. An apparatus for wireless communication, comprising:
a processing system configured to:
exchange information through peer-to-peer communication with a second apparatus using a first radio technology, the information regarding at least one additional radio technology;
determine whether to utilize a second radio technology of the at least one additional radio technology for peer-to-peer communication with the second apparatus rather than the first radio technology; and
utilize the first radio technology to exchange control information for the second radio technology.

22. The apparatus of claim 21, wherein to determine whether to utilize the second radio technology, the processing system is configured to:
determine a first metric for utilizing the first radio technology;
determine a second metric for utilizing the second radio technology; and
determine whether to utilize the second radio technology based on the first and second metrics.

23. The apparatus of claim 22, wherein the first metric is a cost for utilizing the first radio technology and the second metric is a cost for utilizing the second radio technology, and the second radio technology is determined to be utilized when the second metric is less than the first metric.

24. The apparatus of claim 22, wherein the first metric is based on at least one performance characteristic of the first radio technology and the second metric is based on at least one performance characteristic of the second radio technology, and the second radio technology is determined to be utilized when a comparison of the first metric and the second metric indicates that the second radio technology would have better performance than the first radio technology.

25. The apparatus of claim 22, wherein the first metric is a first data transmission rate of communication using the first radio technology and the second metric is a second data transmission rate of communication using the second radio technology, and the second radio technology is determined to be utilized when the second metric is greater than the first metric.

26. The apparatus of claim 22, wherein the apparatus and the second apparatus are separated by a distance, the first radio technology has a first communication range and the second radio technology has a second communication range less than the first communication range, and the second radio technology is determined to be utilized when the second communication range is greater than the distance.

27. The apparatus of claim 26, wherein the exchanging information with the second apparatus using the first radio technology occurs when the first communication range is greater than the distance, the second communication range is less than the distance, and the apparatus anticipates that the second communication range will be greater than a future distance between the apparatus and the second apparatus.

28. The apparatus of claim 21, wherein the exchanging information with a second apparatus using a first radio technology comprises conducting peer discovery with the second apparatus through the first radio technology.

29. The apparatus of claim 21, wherein the exchanged control information comprises at least one of physical (PHY) layer parameters, media access control (MAC) layer parameters, network layer parameters, or security parameters for the second radio technology.

30. The apparatus of claim 29, wherein the processing system is further configured to:
configure the second radio technology using the exchanged control information;
terminate the communication with the second apparatus through the first radio technology upon exchanging the control information for the second radio technology; and
communicate with the second apparatus through the second radio technology.

31. A computer program product in a first wireless device, the computer program product stored on a non-transitory computer-readable medium and comprising code that when executed on at least one processor performs the steps of:
exchanging information through peer-to-peer communication with a second wireless device using a first radio technology, the information regarding at least one additional radio technology;
determining whether to utilize a second radio technology of the at least one additional radio technology for peer-to-peer communication with the second wireless device rather than the first radio technology; and
utilizing the first radio technology to exchange control information for the second radio technology.

32. The computer program product of claim 31, wherein the code for determining whether to utilize the second radio technology performs the steps of:
determining a first metric for utilizing the first radio technology;
determining a second metric for utilizing the second radio technology; and determining whether to utilize the second radio technology based on the first and second metrics.

33. The computer program product of claim 32, wherein the first metric is a cost for utilizing the first radio technology and the second metric is a cost for utilizing the second radio technology, and the second radio technology is determined to be utilized when the second metric is less than the first metric.

34. The computer program product of claim 32, wherein the first metric is based on at least one performance characteristic of the first radio technology and the second metric is based on at least one performance characteristic of the second radio technology, and the second radio technology is determined to be utilized when a comparison of the first metric and the second metric indicates that the second radio technology would have better performance than the first radio technology.

35. The computer program product of claim 32, wherein the first metric is a first data transmission rate of communication using the first radio technology and the second metric is a second data transmission rate of communication using the second radio technology, and the second radio technology is determined to be utilized when the second metric is greater than the first metric.

36. The computer program product of claim 32, wherein the first wireless device and the second wireless device are separated by a distance, the first radio technology has a first communication range and the second radio technology has a second communication range less than the first communication range, and the second radio technology is determined to be utilized when the second communication range is greater than the distance.

37. The computer program product of claim 36, wherein the exchanging information with the second wireless device using the first radio technology occurs when the first communication range is greater than the distance, the second communication range is less than the distance, and the first wireless device anticipates that the second communication range will be greater than a future distance between the first and second wireless devices.

38. The computer program product of claim 31, wherein the code for exchanging information with a second wireless device using a first radio technology performs the steps of conducting peer discovery with the second wireless device through the first radio technology.

39. The computer program product of claim 31, wherein the exchanged control information comprises at least one of physical (PHY) layer parameters, media access control (MAC) layer parameters, network layer parameters, or security parameters for the second radio technology.

40. The computer program product of claim 39, further comprising code that when executed on the at least one processor performs the steps of:
configuring the second radio technology using the exchanged control information;
terminating the communication with the second wireless device through the first radio technology upon exchanging the control information for the second radio technology; and
communicating with the second wireless device through the second radio technology.

* * * * *